US007063352B2

(12) United States Patent
Kumakiri et al.

(10) Patent No.: US 7,063,352 B2
(45) Date of Patent: Jun. 20, 2006

(54) SIDE AIRBAG SYSTEM

(75) Inventors: Naotaka Kumakiri, Saitama (JP);
Toyohiko Shindo, Saitama (JP);
Mikihito Kojima, Saitama (JP);
Takashi Yanagihara, Saitama (JP);
Makoto Nagai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/635,295

(22) Filed: Aug. 6, 2003

(65) Prior Publication Data
US 2004/0041377 A1 Mar. 4, 2004

(30) Foreign Application Priority Data
Aug. 30, 2002 (JP) .............................. 2002-252445

(51) Int. Cl.
*B60R 21/16* (2006.01)
(52) U.S. Cl. ..................... 280/730.2; 280/735; 701/45; 180/273
(58) Field of Classification Search ............. 280/730.2, 280/732, 734, 735; 701/45; 180/273
See application file for complete search history.

(56) References Cited

U.S. PATENT DOCUMENTS

| 6,007,094 A | * | 12/1999 | Hosoda | ....................... 280/735 |
| 6,043,736 A | * | 3/2000 | Sawahata et al. | ........... 340/438 |
| 6,056,079 A | * | 5/2000 | Cech et al. | .................. 180/273 |
| 6,253,133 B1 | * | 6/2001 | Sakai et al. | .................... 701/45 |
| 6,345,839 B1 | * | 2/2002 | Kuboki et al. | .............. 280/735 |
| 6,356,200 B1 | * | 3/2002 | Hamada et al. | .............. 340/667 |
| 6,378,899 B1 | * | 4/2002 | Fujimoto | ..................... 280/735 |
| 6,407,347 B1 | * | 6/2002 | Blakesley | .................... 177/144 |
| 6,445,988 B1 | * | 9/2002 | Breed et al. | ................... 701/45 |
| 6,459,973 B1 | * | 10/2002 | Breed et al. | .................. 701/45 |
| 6,609,055 B1 | * | 8/2003 | Stanley | ........................ 701/45 |
| 6,652,000 B1 | * | 11/2003 | Pajon | ......................... 280/735 |
| 6,684,973 B1 | * | 2/2004 | Baba et al. | ................. 180/273 |

FOREIGN PATENT DOCUMENTS

JP 2000-085524 3/2000

* cited by examiner

*Primary Examiner*—Paul N. Dickson
*Assistant Examiner*—Toan C. To
(74) *Attorney, Agent, or Firm*—Carrier, Blackman & Associates, P.C.; Joseph P. Carrier; William D. Blackman

(57) ABSTRACT

A side airbag system has a side airbag unit, a posture detector, a weight detector, and a deployment controller. The side airbag unit includes an airbag to be deployed with respect to the sideward direction of the occupant sitting on a vehicle seat. The posture detector determines the posture of the occupant. The weight detector measures the weight of the occupant. The deployment controller controls the deployment of the airbag based on the posture checked by the posture detector and weight measured by the weight detector of the occupant.

12 Claims, 4 Drawing Sheets

41 JUDGEMENT TABLE

| CATEGORY OF WEIGHT \ CATEGORY OF POSTURE | VACANT | LEANING | NORMAL |
|---|---|---|---|
| Empty | OFF | OFF | ON |
| Low | ON | OFF | ON |
| High | ON | ON | ON |
| Fault | ON | OFF | ON |

SIDE AIRBAG SYSTEM

BACKGROUND OF THE INVENTION

1. Field of the Invention

The present invention relates to a side airbag system, which controls the deployment of the side airbag.

2. Description of Relevant Art

As an example of the method for protecting the occupant against injury in the event of collision with another vehicle, the method of deploying the airbag instantly in order to protect the occupant of a vehicle has been known. Among these kinds of airbags, the side airbag to be deployed sideward with respect to the occupant in order to protect the occupant has been widely spread.

In these kinds of side airbags, conventionally, the deployment of the airbag is controlled based on various methods. Among these kinds of the control methods, the method, in which the deployment of the airbag is determined after checking whether or not the occupant is sitting on the seat, has been known. As an example of this method, the side airbag apparatus disclosed in Japanese unexamined patent publication 2000-85524 can be cited.

In this Japanese unexamined patent publication 2000-85524, the presence of the occupant on the seat is checked using an electric capacitance sensor. In this conventional method, since the electric capacitance sensor is disposed at an upper part of the seat back of the seat, the presence of the occupant cannot accurately be detected when the occupant is sitting at the side edge of the seat (the occupant is sitting away from the electric capacitance sensor). In this case, it is judged that there is no occupant on the seat.

That is, the presence of the occupant can not be detected unless the occupant is sitting on the seat in an adequate posture.

In this conventional method, however, the presence of the occupant on the seat can be detected by the electric capacitance sensor irrespective of the size of the occupant's physique as long as the occupant is sitting on the seat in an adequate posture.

In this conventional method, additionally, a presence sensor, which simply detects the presence of the occupant, is used in order to prevent the occurrence of detection error, which is caused by the fluctuation of the humidity in the air, of the electric capacitance sensor. In this conventional method adopting the presence sensor, the detection value obtained by the electric capacitance sensor is regularly initialized if the occupant sensor detects the presence of the occupant on the seat for many hours. Thereby, since the influence of the fluctuation of the humidity can be reduced, the occurrence of detection error can be minimized even if the fluctuation of the humidity in the air occurs.

In this conventional method adopting the initializing methods, the detection of the occupant in response to constantly changing situations has been difficult For the reasons mentioned above, the side airbag system, which can accurately detect the presence of the occupant irrespective of the change of ambient surroundings, and which can control the deployment of the side airbag after checking whether or not the occupant is sitting on the seat, has been required.

SUMMARY OF THE INVENTION

The present invention relates to a side airbag system. This side airbag system has a side airbag unit, a posture detector, a weight detector, and a deployment controller.

The side airbag unit includes an airbag to be deployed with respect to the sideward direction of the occupant sitting on a vehicle seat. The posture detector determines the posture of the occupant. The weight detector measures the weight of the occupant. The deployment controller controls the deployment of the airbag based on the posture checked by the posture detector and weight measured by the weight detector, of the occupant.

According to this side airbag system having these constructions, whether or not to allow the deployment of the airbag is controlled based on the posture and weight of the occupant. Thus, the airbag is not deployed if there is no need to deploy the airbag in the event of side collision with another vehicle.

In this side airbag system, the posture detector categorizes the posture of the occupant into one of three types of posture categories of "VACANT", "LEANING", and "NORMAL", and the posture detector outputs posture information, which indicates the posture category, to the deployment controller. The weight detector categorizes the weight of the occupant into one of four types of weight categories of "EMPTY", "LOW", "HIGH", and "FAULT", and the weight detector outputs a weight information, which indicates the weight category, to the deployment controller. The deployment controller controls the deployment of the airbag based on the posture information and the weight information.

According to the side airbag adopting these constructions, the deployment of the airbag is controlled based on the posture information and weight information of the occupant. Thus, the airbag is not deployed if there is no need to deploy the airbag in the event of side collision with another vehicle.

DETAILED DESCRIPTION OF THE PREFERRED EMBODIMENT

The preferred embodiments of the present invention will be explained with reference to the attached drawings.

Figure 1:
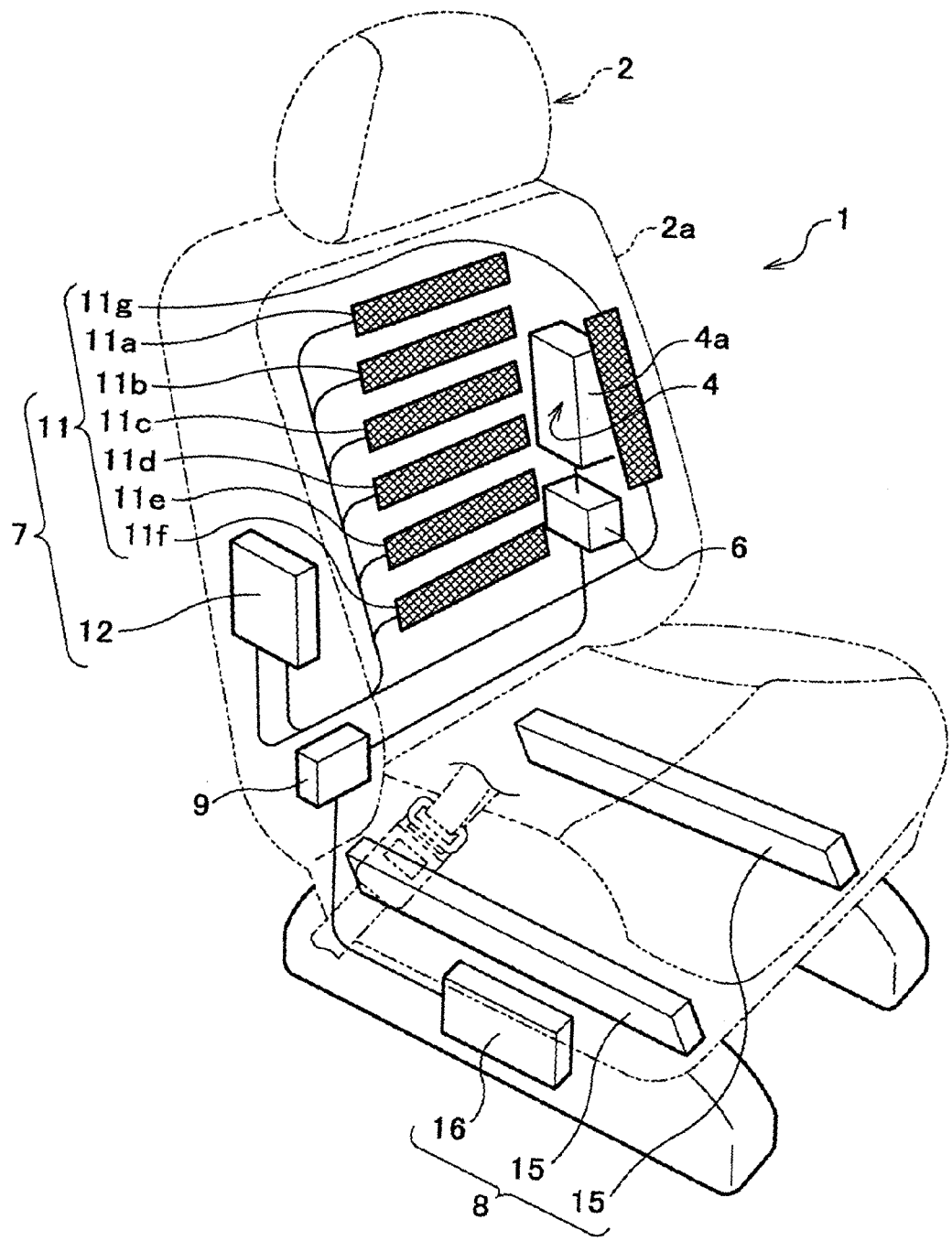
FIG. 1 is an explanatory view showing the construction of the side airbag system according to the present embodiment.
Figure 2:
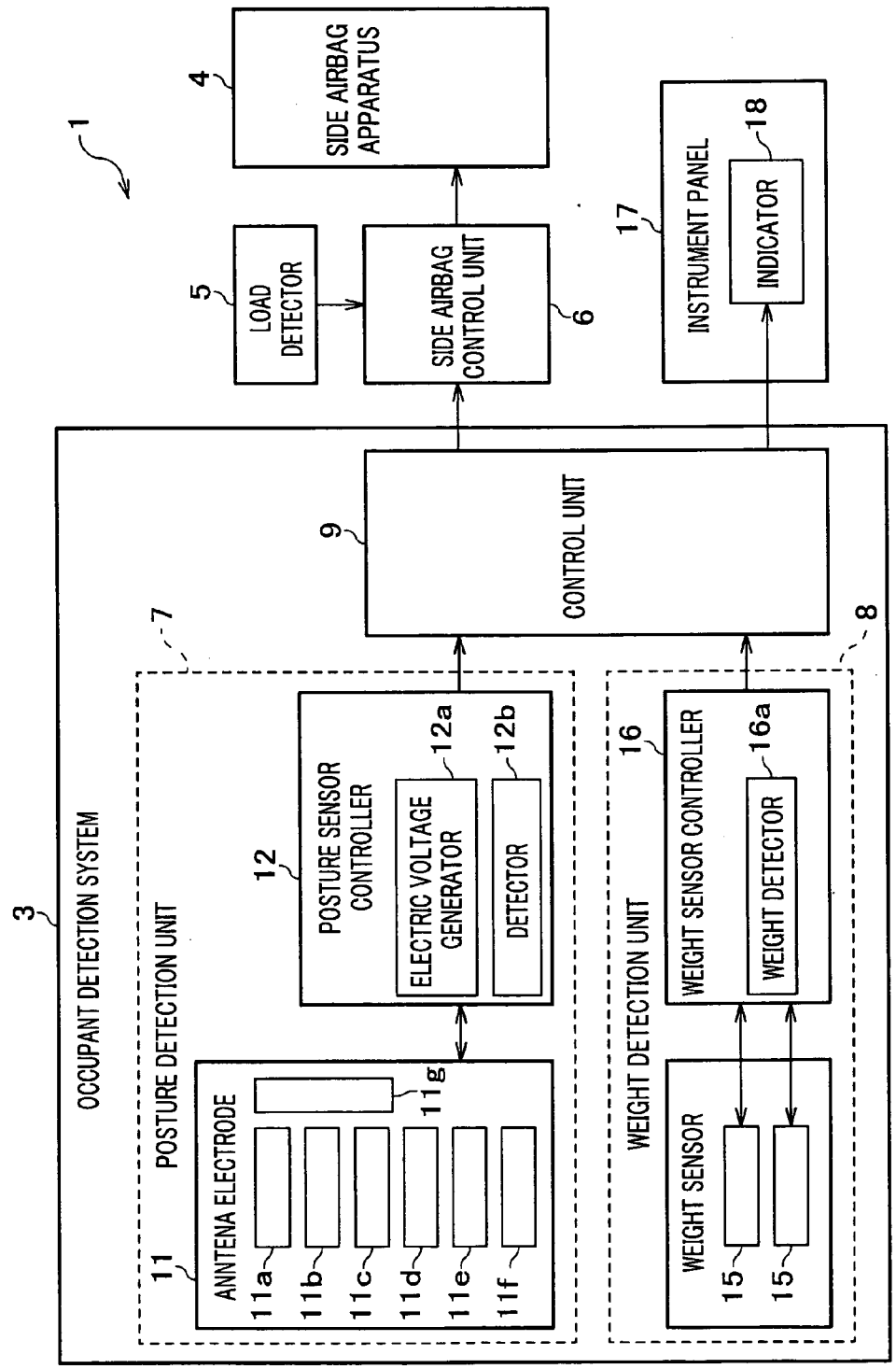
FIG. 2 is a block diagram of the side airbag system.

FIG. 1 is an explanatory view showing the construction of the side airbag system according to the present embodiment. FIG. 2 is a block diagram of the side airbag system.

As shown in FIG. 1 and FIG. 2, a side airbag system 1 has an occupant detection system 3 and side airbag apparatus 4.

The occupant detection system 3 checks the weight and posture of the occupant sitting on the seat 2. In this side airbag system 1, therefore, the deployment of a side airbag (herein after indicated as airbag) installed in the side airbag apparatus 4 is managed based on the detection result to be obtained by the occupant detection system 3. Here, the deployment of the airbag is performed when the command signal, which commands the deployment of the airbag, is entered from the side airbag control unit 6.

Side Airbag Apparatus 4

This side airbag apparatus 4 deploys the airbag to the region between the occupant of the vehicle and the door of the vehicle when a load detector 5 detects the acceleration velocity of greater than a threshold value. In other words, the side airbag apparatus 4 deploys the airbag to the sideward direction with respect to the occupant when the load detector 5 detects the acceleration velocity of greater than a threshold value.

In this side airbag apparatus 4, an airbag in a folded condition is stored in a module case 4a, which is accommodated within the seat back 2a. The position, where the side airbag apparatus 4 is accommodated, is one side in the width direction of the seat 2.

If the vehicle adopting the present invention's side airbag system collides with another vehicle and the load detector 5 detects the acceleration velocity of greater than a threshold value, the airbag is inflated by the gasses supplied from an inflator (not shown) stored in the module case 4a. Then, the inflated airbag bursts through a tear line (not shown) of the seat back 2a and deploys toward the inside of the vehicle cabin.

In the present embodiment, the side airbag apparatus 4 is stored within the seat back 2a. But the position of this side airbag apparatus 4 is not limited to this, for example, this side airbag apparatus 4 may be stored in the roof side rail, pillar, and the door.

The Occupant Detection System 3

The occupant detection system 3, as shown in FIG. 1, has a posture detection unit 7, a weight detection unit 8, and a control unit 9. The posture detection unit 7 is provided at the seat back 2a and checks (measures) the posture of the occupant sitting on the seat 2. The weight detection unit 8 has a weight sensor and measures the weight of the occupant sitting on the seat 2 by this weight sensor.

The control unit 9 determines whether or not to operate the side airbag apparatus 4 based on the result of detections (detection result) obtained by both of the posture detection unit 7 and the weight detection unit 8. In other words, the control unit 8 determines whether or not to allow the deployment of the side airbag based on the posture and weight of the occupant sitting on the seat 2

In the present embodiment, the occupant detection system 3 detects not only the presence of the occupant but the absence of the occupant.

Posture Detection Unit 7

The posture detection unit 7 has an antenna electrode 11 and a posture sensor controller 12. The antenna electrode 11 is provided on the seat back 2a. The posture sensor controller 12 is connected to the antenna electrode 11.

This posture detection unit 7 detects the presence and posture of the occupant on the seat 2 by checking the electric capacitance. That is, in the present embodiment, an electric capacitance sensor is used as antenna electrode.

The antenna electrode 11 is composed of plurality of first antenna electrodes 11a, 11b, 11c, 11d, 11e, and 11f, and a second antenna electrode 11g.

As shown in FIG. 1, each first antenna electrode has a belt-like shape and is stored within the seat back 2a so that the longitudinal direction the of first antenna electrode is placed along the right-and-left direction (width direction) with respect to the seat back 2a. Every first antenna electrode is lined up along the up-and-down direction (height direction) with respect to the seat 2 at regular intervals.

The second antenna electrode 11g also has a belt-like shape and is placed at the door side of the seat back 2a so that the longitudinal direction of the second antenna electrode 11g is placed along the up-and-down direction (height direction) of the seat back 2a. In other words, this second antenna electrode 11g is placed in the one side, on which the side airbag apparatus 4 is provided, of seat 2.

As shown in FIG. 2, the posture sensor controller 12 is equipped with CPU and ROM, and has an electric voltage generator 12a and a detector 12b.

The electric voltage generator 12a has a high-frequency oscillation circuit and a resistor. The high-frequency oscillation circuit generates the electric field between the antenna electrode 11 and the earth (vehicle body).

This electric voltage generator 12a computes the current value from the resistor's voltage, which varies depending on the strength of the electric field, and outputs the computed current value as the monitor current.

The electric voltage generator 12a is controlled so that the electric voltage generator 12a connects with every antenna electrode (first antenna electrodes 11a–11f and second antenna electrode 11g) in order.

In the present embodiment, for example, the electric voltage generator 12a connects with every antenna electrode 11 in this order: the first antenna electrode 11a, the first antenna electrode 11b, the first antenna electrode 11c, the first antenna electrode 11d, the first antenna electrode 11e, the first antenna electrode 11f, the second antenna electrode 11g.

Thereby, the electric voltage generator 12a obtains the monitor current from each antenna electrode 11a–11g, respectively, and regards these series of monitor currents as the pattern. In the present embodiment, therefore, the detector 12b checks the profiles of this pattern, and estimates the occupant's present posture.

In the present embodiment, for example, if the output from the first antenna disposed at the downside is relatively high, it is judged that the physique of the occupant sitting on the seat 2 is small. In other words, the output current entered from the first antennas 11e and 11f exceeds the output entered from another first antenna 11a–11c, the detector 12b considers that the physique of the occupant sitting on the seat 2 is small.

On the other hand, when the outputs from first antenna 11a through 11d and second antenna electrode 11g are high, it is judged that the physique of the occupant sitting on the seat 2 is large.

In the present embodiment, additionally, when the outputs from the second antenna electrode 11g is high, the detector 12b considers that the present occupant's state is at least one situation among the situations of: the occupant is leaning against the door side, the occupant is sitting close to the door, and the occupant's body is relatively large in the width direction.

In the present embodiment, the posture sensor controller 12 categorizes the occupant's state into one of three different types. One of these different types is "VACANT", another of these different types is "LEANING", and the last of these different types is "NORMAL".

In the present embodiment, when the output from the antenna electrode 11 is below a threshold value, the posture sensor controller 12 considers that the occupant is not sitting on the seat 2, and categorizes the occupant's state as "VACANT".

When the output from the second antenna electrode 11g exceeds the threshold value, on the other hand, the posture sensor controller 12 considers that the occupant is sitting at the door side of the seat 2, and categorizes the occupant's state as "LEANING".

When all the outputs from the first antenna electrodes 11a, 11b, 11c, 11d, 11e, and 11f exceeds the threshold value, furthermore, the posture sensor controller 12 considers that the occupant is sitting on the seat 2 at the usual state. Then, the posture sensor controller 12 categorizes the occupant's state as "NORMAL".

Then, the posture sensor controller 12 outputs the signal indicating the selected category to the control unit 9. In other words, the posture sensor controller 12 outputs the posture information, which indicates the category, to the control unit 9.

Weight Detection Unit 8

Next, the explanation about the weight detection unit 8 will be carried out.

As shown in FIG. 1, the weight detection unit 8 has pair of weight sensors 15, and a weight sensor controller 16. Each weight sensor 15 is disposed between the bottom of the seat 2 and a floor of the vehicle cabin. The weight sensor controller 16 controls the weight sensor 15.

This weight detection unit 8 measures the weight of the occupant together with the weight of the seat 2, and checks the presence or absence of the occupant. If it is considered that the occupant is sitting on the seat 2, additionally, the weight detection unit 8 categorizes the occupant into one of two-types, such as adult or child.

Figure 3:
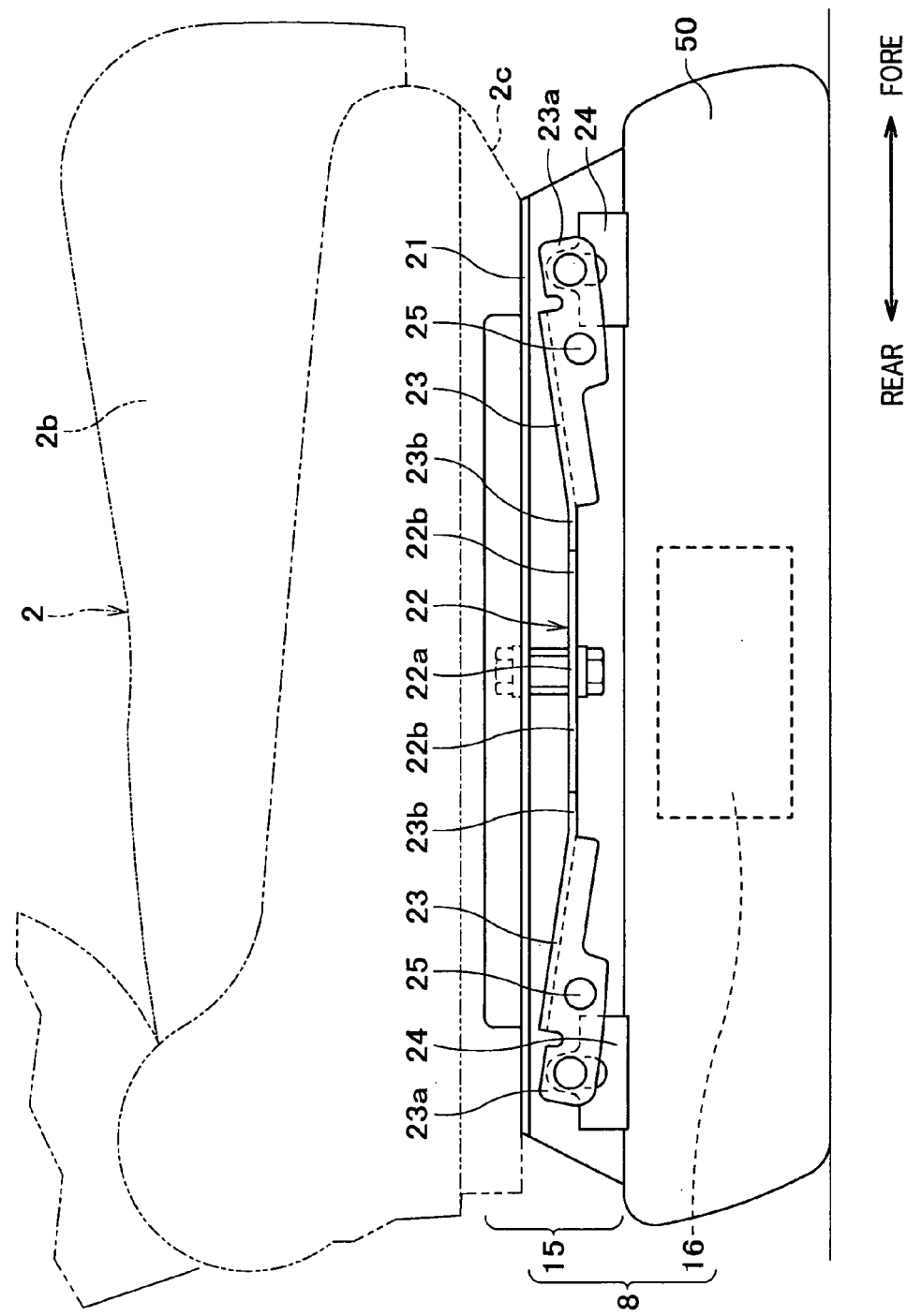
FIG. 3 is a sectional view showing the construction of the weight sensor 15.

FIG. 3 is a sectional view showing the construction of the weight sensor 15.

In the weight sensor 15, as shown in FIG. 3, a seat rail 2c, which is used for sliding the seat 2 in the fore-and-rear directions, is provided at the bottom of the seat cushion 2b of the seat 2. A base plate 21, which accommodates a sensor plate 22 therein, is fixed at the bottom of the seat rail 2c. The sensor plate 22 is fixed at the middle in the front-and-rear direction with respect to the seat 2 of the base plate 21. On this sensor plate 22, an electric circuit which serves as the strain gage is provided.

In this sensor plate 22, the midpoint in the longitudinal direction thereof serves as a holding part 22a, and the both ends thereof serves as the end part 22b. In this sensor plate 22, since only the holding part 22a is fixed, both end parts 22b of this sensor plate 22 are allowed to move in the up-and-down directions.

Each end part 22b is connected to a bracket 24 being fixed at a fixing member 50, through an arm 23.

Since this arm 23 is allowed to move around the fixing pin 25, when a fore-side end 23a of the arm 23 is moved upwardly, the rear-side end 23b of the arm 23 is moved downwardly.

Thus, when the occupant sits down on the seat 2 and the base plate 21 sinks downwardly, since bracket 24 is fixed at fixing member 50 and cannot be moved downwardly, the sensor plate 22 is deformed in compliance with the degree of the deformation of the base plate 21.

Here, the electric circuit, which serves as the strain gage, is provided on the sensor plate 22, and the resistance value of the electric circuit varies in compliance with the degree of the deformation of the base plate 21. Thus, the amount of the load being added to the weight detection unit 8 can be computed by using the resistance value of the electric circuit.

In the present embodiment, the load obtained by this computing includes the empty weight of the seat 2. Thus, the actual weight of the occupant can be obtained by subtracting the empty weight of the seat 2 from the load obtained by computing.

The weight sensor controller 16 is equipped with CPU and ROM, and has a weight detector 16a. This weight detector 16a measures the variations in the resistance of the electric circuit (strain gage). The weight detector 16a refers to the table showing the relationship between the weight and the resistance of the strain gage based on the measured resistance, and obtains the weight of the occupant. Then, the weight sensor controller 16 outputs the information indicating the weight of the occupant to the control unit 9.

Here, the information to be outputted from the weight sensor controller 16 may be an actual value of the weight, and may be the unique identification code being assigned to each category, which is classified based on the difference of the weight.

In the present embodiment, for example, the weight sensor controller 16 selects one category from the predetermined categories, and outputs the signal indicating the selected category. In other words, the weight sensor controller 16 selects one category, such as "EMPTY", from among the categories of "EMPTY", "LOW", "HIGH", and "FAULT". Then, the weight sensor controller 16 outputs the signal indicating the selected category to the control unit 9. In other words, the weight sensor controller 16 outputs the weight information, which indicates the category, to the control unit 9.

Here, if there is no significant change in the weight of the seat 2, such as in the case that occupant is not sitting on the seat 2 or in the case that a lightweight package is laid on the seat 2, the weight sensor controller 16 selects "EMPTY".

If the weight of the seat 2 is increasing and the weight value is under the threshold value, the weight sensor controller 16 selects "LOW".

If the weight of the seat 2 is increasing and the weight value exceeds the threshold value, the weight sensor controller 16 selects "HIGH".

If the present state cannot be classified into any of "EMPTY", "LOW", and "HIGH", the weight sensor controller 16 selects "FAULT".

Then, the weight sensor controller 16 outputs the signal, which indicates the selected category, such as "EMPTY", "LOW", "HIGH", and "FAULT".

Here, the threshold value is the value, by which the classifications of adult or child can be achieved. That is, if the category of "HIGH" is selected by the weight sensor controller 16, this means that the occupant sitting on the seat 2 is adult.

If the category of "FAULT" is selected by the weight sensor controller 16, additionally, this means that the weight of the seat 2 exceeds the upper limit or falls below the lower limit.

For example, if the failures of weight detection unit 8, or the breaking of the electric wiring of the weight detection unit 8, or the influence of the external factors, such as rapid temperature changes, occur, the category of "FAULT" would be selected.

In this weight detection unit 8, essentially, the selection of "FAULT" is unlikely to occur. In the present invention, however, the category of "FAULT" is adopted in consideration of fail-safe operation.

Control Unit 9

The control unit 9 is composed of CPU and ROM, and determines whether or not to operate the side airbag apparatus 4. On this occasion, the control unit 9 refers to the judgment table 41 (shown in FIG. 4) based on data (posture information and weight information) to be entered from the posture sensor controller 12 and the weight sensor controller 16, and makes a decision whether or not to operate the side airbag apparatus 4. Then, the control unit 9 outputs the result of judgment to the side airbag control unit 6.

The judgment table 41 is a matrix table, by which whether or not to operate the side airbag apparatus 4 is determined. To be more precise, whether or not to allow the deployment of the side airbag is determined by this judgment table 41. In the present embodiment, the judgment using this matrix table (judgment table 41) is made based on the four detection results with regard to the weight and three detection results with regard to the posture of the occupant. In this judgment table 41, "OFF" means that the deployment of the side airbag is not allowed, and "ON" means that the deployment of the side airbag is allowed.

In the present embodiment, if "OFF" is selected, the control unit 9 outputs the signal, which commands the lighting of the indicator 18 disposed on the instrumental panel 17. By this establishment, the occupant of the vehicle can recognize that the side airbag will not be deployed if the side collision with another vehicle will occur. Thereby, the occupant of the vehicle can correct his or her posture at individual discretion as appropriate.

Motion in the Control Unit 9

Figures 4, 5:
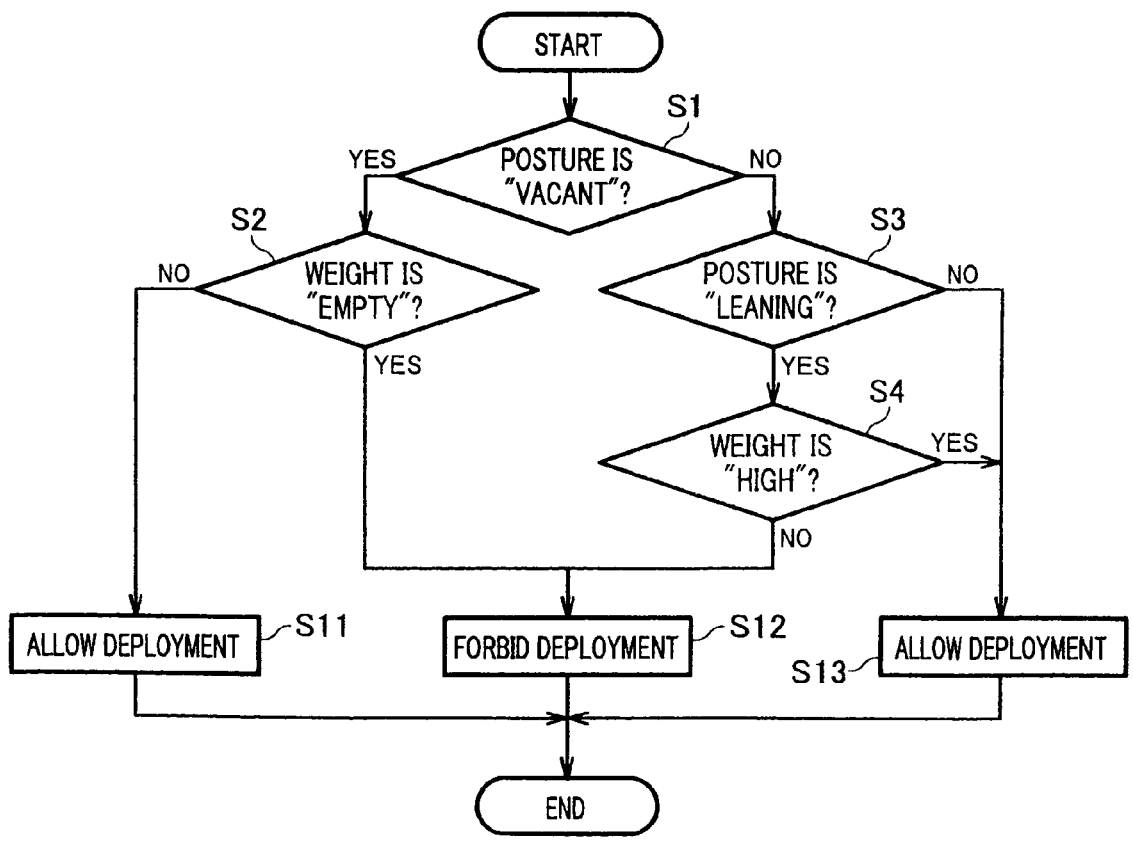
FIG. 4 is an explanatory view showing the judgment table, by which whether or not to allow the deployment of the airbag is determined.
FIG. 5 is flow chart showing the operation being performed by the control unit.

Next, the decision process of whether or not to operate the side airbag of the side airbag apparatus 4 will be explained with reference to the flow chart shown in FIG. 5.

When the posture information and the weight information are entered from the posture sensor controller 12 and the weight sensor controller 16, respectively, the control unit 9 checks whether or not the category of the posture is "VACANT" (Step 1).

If the category of posture is "VACANT", the control unit 9 checks whether or not the category of the weight is "EMPTY" (Step 2). Then, if the category of the weight is not "EMPTY", the control unit 9 outputs the command signal (hereinafter indicated as OK signal), which allows the deployment of the airbag, to the side airbag control unit 6 (Step 11). If the category of the weight is "EMPTY", the control unit 9 outputs the command signal (hereinafter indicated as STOP signal), which forbids the deployment of the airbag, to the side airbag control unit 6 (Step 12).

If the category of the posture is not "VACANT" at Step 1, the control unit 9 checks whether or not the category of the posture is "LEANING" (Step 3).

If the category of the posture is "LEANING", the control unit 9 checks whether or not the category of the weight is "HIGH". If the category of the weight is not "HIGH", the control unit 9 regards that the occupant sitting on the seat 2 is child and this occupant is leaning against the door side. Then, the control unit 9 outputs the STOP signal to the side airbag control unit 6 (Step 12).

If the category of the posture is not "LEANING", or if the category of the posture is "LEANING" and the category of the weight is "HIGH", the control unit 9 outputs the OK signal to the side airbag control unit 6 (Step 13).

In this side airbag control unit 6, these operations from Step 1 through Step 13 are repeated at a short intervals.

In the present embodiment, as described above, the control unit 9 determines whether or not to allow the deployment of the airbag of the side airbag apparatus 4 based on the judgment table 41.

For example, if the category of the weight is "EMPTY" and the category of posture is "VACANT", the deployment of the airbag of the side airbag apparatus 4 is not allowed.

If the category of weight is "HIGH", i.e. if the occupant sitting on the seat 2 is adult, the deployment of the airbag of the side airbag apparatus 4 is allowed irrespective of the posture of the occupant.

If the category of the weight is not "HIGH" and the category of the posture is "LEANING", the deployment of the airbag of the side airbag apparatus 4 is not allowed.

If the category of the weight of the occupant is "FAULT", the control unit 9 determines whether or not to allow the deployment of the airbag of the side airbag apparatus 4 based on the category of the posture.

If the category of the weight is "FAULT" and the category of the posture is either of "VACANT" or "NORMAL", for example, the control unit 9 allows the deployment of the airbag. In this occasion, if the category of the posture is "INCLINING", the deployment of the airbag is not allowed.

Next, the decision process of whether or not to operate the side airbag apparatus 4, which is performed with a focus on the posture of the occupant, will be explained.

If the category of the posture is "VACANT" and the category of the weight is "EMPTY", the deployment of the airbag of the side airbag apparatus 4 is not allowed.

If the category of posture is "LEANING", and the category of the weight is "HIGH", the deployment of the airbag of the side airbag apparatus 4 is allowed.

If the category of the posture is "NORMAL", the deployment of the airbag of the side airbag apparatus 4 is allowed irrespective of category of the weight.

In the present embodiment, as described above, the decision of whether or not to operate the side airbag apparatus 4 is performed based on the category of the posture or weight of the occupant.

That is, in the present invention's side airbag system 1, the airbag of the side airbag apparatus 4 is not deployed even if side collision with another vehicle happens if the control unit 9 determines not to allow the deployment of the airbag.

In the present invention, furthermore, if the head of the child is positioned within the deployment area of airbag or if the occupant is leaning against the door side, the side airbag control unit 6 does not allow the deployment of the airbag. airbag.

In the present invention, if the weight of the occupant is "HIGH", the deployment of the airbag is allowed even if the result of the posture is "VACANT", in order to secure the safety of the occupant with fail-safe. Thereby, the safety of the occupant can be achieved even if the occupant is sitting at the fore end of the seat.

Although there have been disclosed what are the patent embodiment of the invention, it will be understood by person skilled in the art that variations and modifications may be made thereto without departing from the scope of the invention, which is indicated by the appended claims.

For example, the side airbag system according to the present invention may include a self-diagnostic detector, which checks the mechanical damage or the breaking of the wiring. By providing this self-diagnostic detector, the failure of the side airbag system 1 can be detected, and can give prior warning to the occupant.

In the present invention, additionally, a pressure sensor may be adoptable instead of the electric capacitance sensor.

What is claimed is:

1. A side airbag system comprising:
 a side airbag unit, which deploys an airbag in a sideward direction with respect to an occupant sitting on a vehicle seat;
 a posture detector, which determines a posture of said occupant;

a weight detector, which measures a weight of said occupant; and a deployment controller, which controls the deployment of said airbag based on said posture and weight of said occupant, wherein the posture detector includes a plurality of sensors disposed on a seat back of the vehicle seat, and the posture detector monitors a pattern of signal output from the plurality of sensors on the seat back by comparing signal output of each sensor with signal output of the remaining sensors, and estimates the occupant's posture based on a profile of this pattern.

2. A side airbag system according to claim 1, wherein said deployment controller allows the deployment of said airbag irrespective of the posture of said occupant, when said weight measured by said weight detector exceeds a threshold value.

3. A side airbag system according to claim 1, wherein the posture detector comprises a means for discriminating between small and large occupants.

4. A side airbag system according to claim 1, wherein the output from said weight detector is categorized, and the deployment controller controls the airbag based on the category of the output of the weight detector.

5. A side airbag system according to claim 1, wherein the output from said posture detector is categorized, and the deployment controller controls the airbag based on the category of the output of the posture detector.

6. A side airbag system according to claim 5, wherein the output from said weight detector is categorized, and the deployment controller controls the airbag based on the category of the output of the weight detector.

7. A side airbag system comprising:

a side airbag unit, which deploys an airbag in a sideward direction with respect to an occupant sitting on a vehicle seat;

a posture detector, which determines a posture of said occupant;

a weight detector, which measures a weight of said occupant; and a deployment controller, which controls the deployment of said airbag based on said posture and weight of said occupant;

said side airbag unit is provided on one side of a seat back of said vehicle seat, and said posture detector includes:

a plurality of first sensors, which are placed on said seat back and are lined up at regular interval along the up-and-down, direction with respect to said seat back, and a second sensor, which is placed on the one side of said seat back, wherein said posture detector categorizes said posture of said occupant into one of multiple posture categories based on the detection result of said first sensors and second sensor, and said posture detector outputs a posture information, which indicates said posture category, to said deployment controller, said weight detector categorizes said weight of said occupant into one of multiple weight categories, and said weight detector outputs a weight information, which indicates said weight category, to said deployment controller, and said deployment controller controls the deployment of said airbag based on said posture information and said weight information.

8. A side airbag system according to claim 7, wherein said deployment controller allows the deployment of said airing irrespective of the posture of said occupant, when said weight measured by said weight detector exceeds a threshold value.

9. A side airbag system comprising:

a side airbag unit, which deploys an airbag in a sideward direction with respect to an occupant sitting on a vehicle seat;

a posture detector, which determines a posture of said occupant;

a weight detector, which measures a weight of said occupant; and a deployment controller, which controls the deployment of said airbag based on said posture and weight of said occupant, wherein said side airbag unit is provided on one side of a seat back of said vehicle seat, and said posture detector includes:

a plurality of first sensors, which are placed on said seat back and are lined up at regular interval along the up-and-down direction with respect to said seat back, and a second sensor, which is placed on the one side of said seat back, wherein said posture detector categorizes said posture of said occupant into one of three types of posture categories of "VACANT", "LEANING", and "NORMAL", and said posture detector outputs a posture information, which indicates said posture category, to said deployment controller, said weight detector categorizes said weight of said occupant into one of four types of weight categories of "EMPTY", "LOW", "HIGH", and "FAULT", and said weight detector outputs a weight information, which indicates said weight category, to said deployment controller, and said deployment controller controls the deployment of said airbag based on said posture information and said weight information.

10. A side airbag system according to claim 9, wherein said deployment controller forbids the deployment of said airbag if said weight category is "EMPTY" and said posture category is "VACANT".

11. A side airbag system according to claim 9, wherein said deployment controller determines whether or not to allow the deployment of said airbag based on said posture information when said weight category is "FAULT".

12. A side airbag system according to claim 9, wherein the output from said posture detector is categorized, and the deployment controller controls the airbag based on the category of the output of the posture detector.

* * * * *